May 16, 1933.  J. ZUBATY  1,909,739

FACE AND BEZEL FOR INSTRUMENTS

Filed June 28, 1928

Inventor
Joseph Zubaty

By Blackmore, Spencer & Huib
Attorney

Patented May 16, 1933

1,909,739

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

FACE AND BEZEL FOR INSTRUMENTS

Application filed June 28, 1928. Serial No. 289,064.

This invenion relates to measuring instruments. It is intended for use with other instruments also, but is shown applied in connection with a combined speed and distance registering mechanism for which it has been primarily designed.

An object of the invention is to provide a combined unitary face and bezel for a speedometer, or other instruments. A further object is to make use of one part combining the bezel, the face and the gaskets as commonly used heretofore. Economy in manufacture and convenience in assembly are thus attained.

Figure 1:
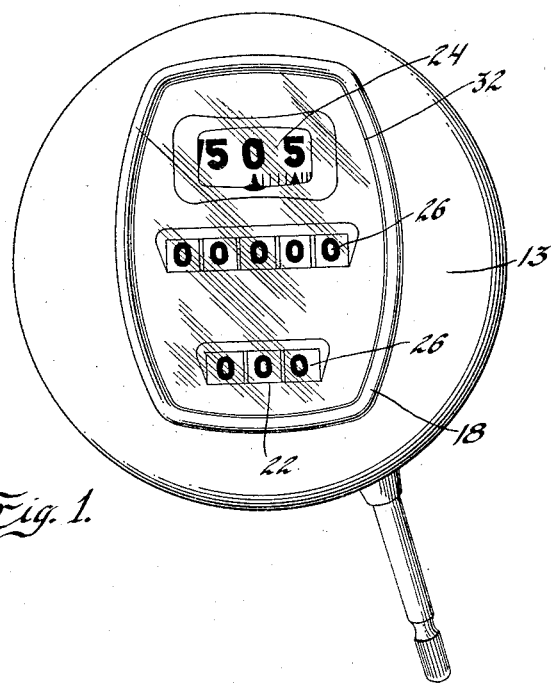
Figure 1 shows a front view of a speedometer embodying my invention.
Figure 2:
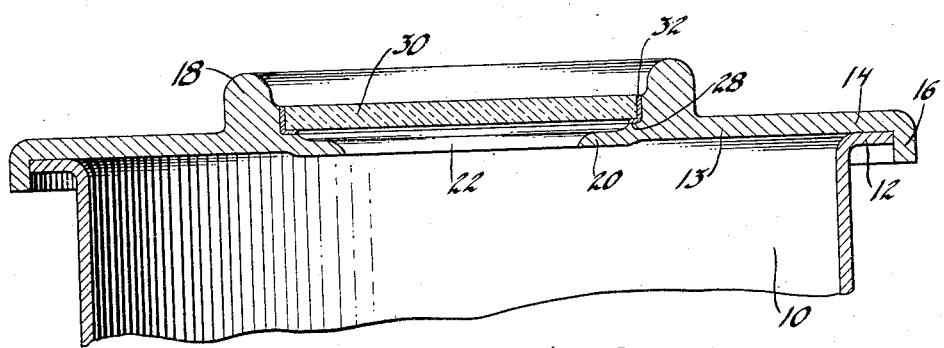
Figure 2 is a sectional view through the instrument case and the combined bezel and face.

Referring by reference characters to the drawing, numeral 10 represents the case which is to house the measuring instrument carrying the speed indicating means and the distance registering means. This case 10 is formed with a flange 12 to provide a seat for the combined face and bezel represented as a whole by numeral 13. This part 13 has an annular part 14 and a terminal flange 16. The case 10 is pressed into the flange 16 and engages the annular part 14 where it is frictionally held by flange 16. The combined unit consisting of the plate and flange has a raised ornamental bezel 18 designed to enter a similarly shaped opening in an instrument panel. The combined unit also has an integral face portion 20 within the bezel, which may have openings 22 to expose the instrument parts, such as the speed cup 24 and the odometer wheels 26. The bezel 18 is also provided with a seat 28 to receive a glass 30, which is held in place by any suitable means such as cement 32. The combined unit is preferably made by the well-known die cast process whereby it will constitute a rugged element and one which does not require expensive machining operations.

Although the invention is shown as applied to a speedometer, it will be obvious that it will be equally applicable to oil gauges, ammeters and in other instruments used on instrument boards or panels.

I claim:

An instrument casing having an open front, a cover for said casing constituting a combined bezel and face plate, said cover having a raised bead forming a closed figure of smaller dimensions than the casing wall and provided at its inner edge with a shoulder adapted to receive a transparent member and forming at its outer edge a shoulder adapted to engage an instrument board, said cover having integral therewith a part adapted to underlie said transparent member and cut out to render visible indicating mechanism within the casing.

In testimony whereof I affix my signature.

JOSEPH ZUBATY.